Aug. 31, 1965  J. R. URSCHEL  3,203,426
MACHINE FOR CUTTING GREEN CORN FROM ITS COB
Filed Dec. 11, 1961  9 Sheets-Sheet 1

INVENTOR.
JOE R. URSCHEL
BY
Charles S. Penfold
ATTORNEY

Aug. 31, 1965   J. R. URSCHEL   3,203,426
MACHINE FOR CUTTING GREEN CORN FROM ITS COB
Filed Dec. 11, 1961   9 Sheets-Sheet 3

INVENTOR.
JOE R. URSCHEL
BY Charles S. Penfold
ATTORNEY

INVENTOR.
JOE R. URSCHEL
BY Charles A. Penfold
ATTORNEY

Aug. 31, 1965 J. R. URSCHEL 3,203,426
MACHINE FOR CUTTING GREEN CORN FROM ITS COB
Filed Dec. 11, 1961 9 Sheets-Sheet 5

INVENTOR.
JOE R. URSCHEL
BY Charles S. Penfold
ATTORNEY

Aug. 31, 1965 J. R. URSCHEL 3,203,426
MACHINE FOR CUTTING GREEN CORN FROM ITS COB
Filed Dec. 11, 1961 9 Sheets-Sheet 6

INVENTOR.
JOE R. URSCHEL
BY
Charles S. Penfield
ATTORNEY

INVENTOR.
JOE R. URSCHEL
BY
Charles A. Penfold
ATTORNEY

United States Patent Office 3,203,426
Patented Aug. 31, 1965

3,203,426
MACHINE FOR CUTTING GREEN CORN FROM ITS COB
Joe R. Urschel, 202 Michigan Ave., Valparaiso, Ind.
Filed Dec. 11, 1961, Ser. No. 159,824
13 Claims. (Cl. 130—9)

The invention relates generally to means for conditioning a natural food product such as ears of immature corn and more particularly is directed to a machine and/or a process for cutting the layer of kernels from the cob.

The subject application is a continuation-in-part of my application, Serial No. 718,741, filed March 3, 1958.

One of the principal objects of the invention is to provide a unique process for removing the layer of kernels from an ear of corn, which comprises severing the kernels while the ear is being rotated and conveyed and in squeezing the cob as the corn is being removed so as to extract or release any fluid, juice or milk and/or any fragments of the corn which may be left on the cob or core following the cutting operation.

More particularly, the machine is preferably utilized for at least two purposes. One purpose is to cut the kernels relatively deep on rather immature corn to produce what is referred to in the trade as whole kernel corn. In producing this type of corn, the cream is of no value and is discarded. The other purpose is to cut or sever kernels at a relatively shallow depth from more mature corn in order not to get down into the tough skin of the kernel. The cream or juice is then squeezed off the cob and mixed back with the shallow cut kernels to produce what is known as cream style corn.

A significant object of the invention is to provide a machine or apparatus comprising, among other things, a plurality of axially spaced sets or groups of rollers which are angularly or substantially spirally arranged to define a longitudinal passage through which the ears of corn are successively rotated and conveyed and a plurality of cutters interposed in the passage for severing the corn from the cob during such rotation and conveyance.

A particular object of the invention is to provide a machine in which the rollers of each set or groups are selectively carried by individual but connected supports which are mounted for simultaneous rotatable or rockable movement on relatively long drive shafts which are drivingly connected to the rollers and the shafts are operated or rotated by a power means preferably in the form of an electric motor.

An important object of the invention is to provide a machine in which the cutters are operatively associated with the supports for one set of rollers for disposition between this set of rollers and an adjacent set of rollers carried by supports therefor, with unique means for operatively connecting the supports in a manner whereby the rocking movement of the supports for the one set of rollers is substantially controlled by the supports for the adjacent set of rollers and vice-versa. More specifically in this respect, the connections between the supports are so constructed and arranged that when a product is introduced between the adjacent set of rollers these rollers will be caused to move away from one another and swing their supports about the drive shafts and thereby effect simultaneous and proportional swinging movement of the supports for the one set of rollers and cutters associated therewith so as to predetermine or gauge the distance between the rollers of this one set as well as the distance between the cutters so that the cutters will sever the product from its core at a predetermined depth and the said one set of rollers will properly accommodate the core and squeeze it for the purpose above alluded to. Otherwise expressed, the depth of the cut is determined or gauged by the cross-sectional dimension or size of the product. With this novel organization the depth of the cut may be controlled so as to sever, for example, kernels of corn relatively close to the cob or at any depth desired without including the hulls or fragments thereon.

Another important object of the invention is to provide means for simultaneously urging the supports for the said one and adjacent sets of rollers, above referred to, toward a common center line therebetween so that the rollers will resiliently grip or clamp the product and core and also provide means for urging the supports for another set of rollers toward one another for gripping the product substantially independently of the first-mentioned urging means.

A specific object of the invention is to provide means whereby the cutters may be readily selectively adjusted.

Another object of the invention is to provide a chute or means so disposed with respect to the cutters and rollers associated therewith that the severed or edible part of the product will fall into a chamber for reception by a container and the juice and/or other material extracted from the core of the product will fall into an adjacent chamber for reception in the same or a different container, depending on the ultimate use of the product and juice.

Another object of the invention is to provide a machine which includes a belt conveyor mounted in conjunction with a trough for directing ears of corn, or other products having an edible layer carried by a core, toward the rollers.

Also, an object of the invention is to provide a machine in which the rollers and belt conveyor are operatively connected to the drive shafts.

A further object of the invention is to provide a machine with unique adjustments to facilitate gauging of the depth of the cut, including manually operable means associated therewith whereby the knives and/or rollers may be simultaneously moved to promote feeding and cutting of the product.

A specific object of the invention is to provide subassemblies embodying improved principles of design and construction.

A further important object of the invention is to provide rollers which are constructed to firmly hold or grip the product during its travel without injury or damaging the edible part or portions thereof, including an organization or subassemblies or components which are synchronized in movement to rotate and convey the product at a proper rate of speed in order that the cutters will efficiently remove the edible part.

Additional attributes of the invention reside in providing a machine which offers advantages with respect to cost of manufacture and assembly, efficiency in operation, low cost of maintenance, adjustment and durability.

Other objects and advantages of the invention will readily become apparent after the description hereinafter set forth is considered in conjunction with the annexed drawings which exemplify one embodiment of the invention.

The machine structure, illustrated in FIGURES 1 through 15, comprises, among other things, a frame generally designated 1, a conveyor assembly 2 for directing natural edible products, such as immature ears of corn, in a generally longitudinal direction, a first set of two rollers 3, a second set or group of three rollers 4, a third set of three rollers 5 and a fourth set of three rollers 6, all of which rollers rotate and serve to feed the ears from the conveyor to a plurality of three cutters 7 operatively associated with the rollers 6 and/or supports therefor for cutting the kernels off the ears, a vertical chute 8 having a chamber 9 through which the kernels drop into a container and a chamber 10 through which the juice or milk and/or portions of the kernels squeezed or removed from the cob by the rollers 6 following the cutting operation fall into a container, a longitudinal chute 11 for the cobs, and a power means or unit 12 for operating the conveyor assembly and rollers.

The frame 1 may be designed and constructed in various ways but as illustrated includes a pair of upper longitudinal rails 13 and legs 14. Four standards 15, 16, 17 and 18 are detachably mounted on the rails at longitudinally spaced locations as clearly shown in FIGURES 3, 4 and 5. The standards 15, 16 and 17 substantially support the conveyor assembly 2, the standard 16 the first set or pair of rollers 3 and the standards 17 and 18 support three long longitudinally extending operatively connected rotatable drive shafts 19, 20 and 21, which are spaced apart substantially 120 degrees and driven by the power unit 12.

Figure 1:
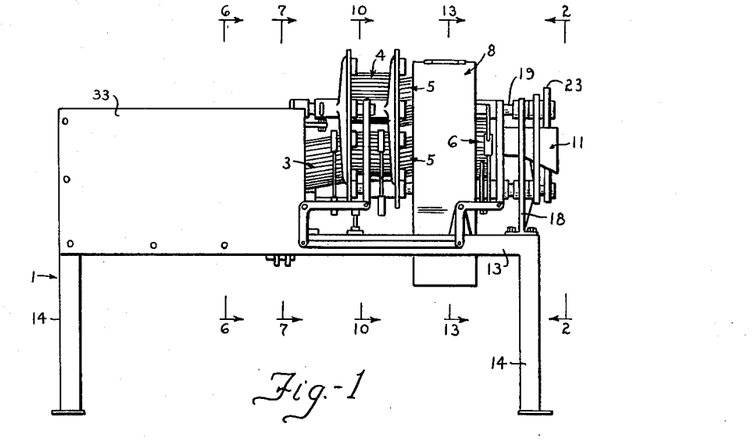
FIGURE 1 is a side elevational view of the machine.
Figure 2:
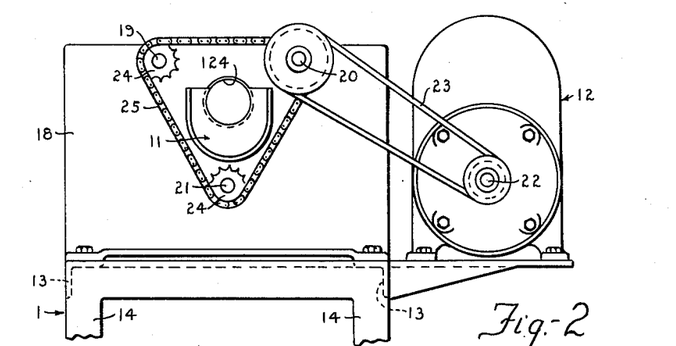
FIGURE 2 is a partial end view of the discharging extremity of the machine, looking in the direction of the arrows 2—2 of FIGURE 1, showing the manner in which the drive shafts are operatively connected with a power means.
Figure 3:
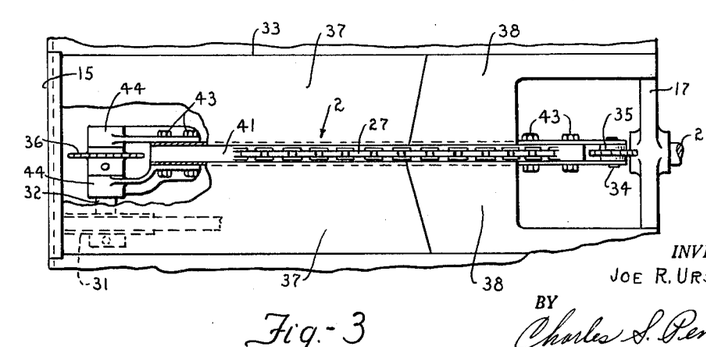
FIGURE 3 is an enlarged partial top view of the belt conveyor and trough with which it is associated.
Figure 4:
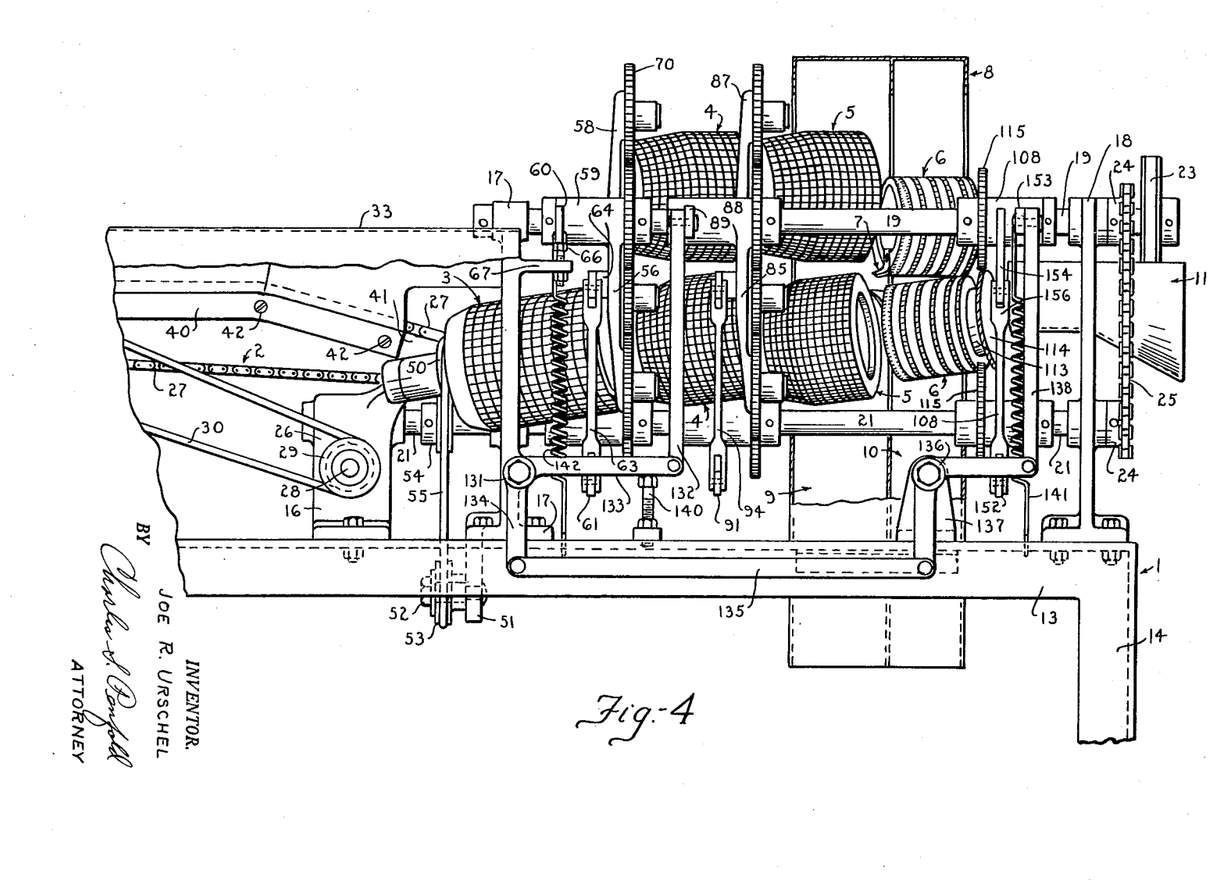
FIGURE 4 is an enlarged partial side elevational view of the machine depicted in FIGURE 1 showing the structural relationship of many of the components comprising the machine.

The power unit 12 is preferably in the form of an electric motor and speed reducer mounted on a shelf carried by the frame and it has a drive shaft 22 which is operatively connected to the longitudinal shaft 20 by a belt and pulley arrangement 23 and the shaft 20 to the shafts 19 and 21 by sprockets 24 thereon and a chain 25 as depicted in FIGURES 2 and 4 to simultaneously rotate the longitudinal shafts at the same rate of speed.

Figure 5:
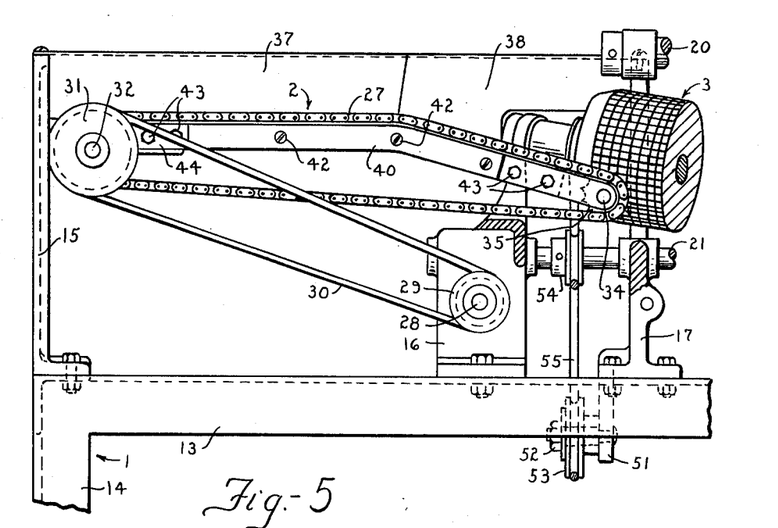
FIGURE 5 is an enlarged partial side elevational view of the belt conveyor showing the manner in which it is operatively connected to one of the drive shafts and its association with a first set of rollers for directing the product thereto.
Figure 6:
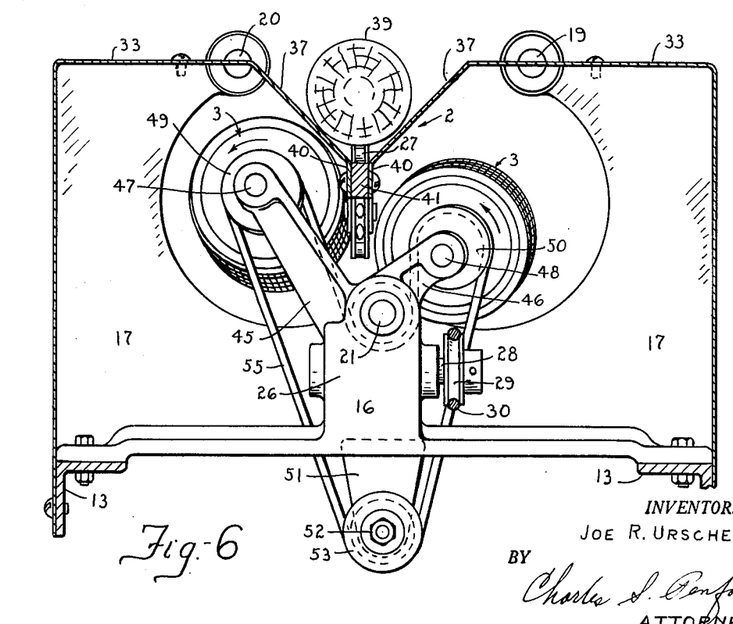
FIGURE 6 is an enlarged transverse elevational view taken substantially on line 6—6 of FIGURE 1, illustrating other structure embodied in the belt conveyor subassembly.

The conveyor assembly 2 may be designed and constructed in various ways but as shown in FIGURES 3 through 6 includes, among other things, a gear box 26, carried by the standard 16, which box is operatively connected to the lower longitudinal shaft 21 and to an endless chain belt 27 through the agency of a pulley and belt arrangement. More particularly in this regard, a shaft 28 extends from the box and carries a pulley 29 which is connected by a belt 30 to a pulley 31 carried by a shaft 32 mounted on a cover means 33 associated with and/or constituting a component of the conveyor assembly. A shaft 34 is also mounted on the cover and this shaft and shaft 32 are respectively provided with sprockets 35 and 36 which carry the conveyor belt 27. The cover means 33 is detachably mounted on the standards 15 and 17 and frame and preferably includes a pair of corresponding horizontally disposed converging portions 37 and a pair of similar but inclined portions 38 so as to form a trough or guideway for ears of corn, including an ear 39 as shown in FIGURE 6. The trough portions are provided with depending parallel continuations 40 and a reenforcing bar 41 constituting a track for the conveyor belt is detachably secured between the continuations by screws 42 and bolts 43. The shaft 34 carrying the sprocket 35 is journalled on a pair of plates detachably secured to and extending beyond the lower inner end of the bar 41 and the shaft 32 carrying the pulley 31 and sprocket 36 is journalled between a pair of brackets 44 which are detachably secured to the opposite end of the bar and the continuations by certain of the bolts 43. With this setup, ears of corn, which may be graded as to size, can be placed in the trough so that the chain belt will carry the ears in a horizontal line or direction and then downwardly to the first set or pair of rollers 3.

The mode of mounting and operating the first set or pair of rollers 3, clearly illustrated in FIGURES 4, 5 and 6, will now be described. The standard 16 carrying the gear box 26 is provided with a pair of upwardly extending angularly disposed arms 45 and 46 having shafts 47 and 48 respectively carried by their free ends. The shafts are angularly arranged, one above the other, with the rollers journalled thereon so that the rollers will pick up an ear of corn and rotate and feed it to the second set or group of rollers 4. In order to promote this feeding movement the exterior surface of each roller is provided with traction means preferably in the form of suitable teeth, serrations or corrugations.

The rollers 3 are also respectively provided with pulleys 49 and 50 and the standard 17 or frame with a depending bracket 51 having a shaft 52 with a pulley or wheel 53 thereon. The lower longitudinal drive shaft 21 which is driven by the motor unit is provided with a pulley 54. A belt 55 is carried by the pulleys 49, 50, 53 and 54 so that when the shaft 21 is rotated, the rollers 3 will simultaneously rotate in the same or counter-clockwise direction at the same rate of speed or r.p.m. as viewed and indicated by the arrows in FIGURE 6. While the lower longitudinal shaft 21 serves to operate the rollers 3 and the conveyor 2 through the agency of the gear box, pulleys or wheels and belts, it is to be understood that motion may be imparted to the conveyor and rollers by any other suitable means. The operative relationship of the conveyor and spacing of the rollers is such that the fore end of an ear of corn will be received by the rollers while its rear end is still on the conveyor in order to jointly control and stabilize the position of the ear during its travel.

The second set of rollers 4 and mode of preferably mounting and operating them, as depicted in FIGURES 4, 7, 8 and 9, will now be described. The lower two of the three rollers 4 are respectively mounted on a pair of supports or rockers 56 and 57 and the upper roller on a support 58. The supports, 56, 57 and 58, are respectively journalled on the longitudinal rotatable shafts 19, 21 and 20. The supports are desirably axially spaced on the shafts by collars, as shown, and each support is provided with a tubular cylindrical hub 59 to impart stability to any rocking movement of the supports relative to the shafts. The rollers are disposed substantially 120 degrees apart to define a passage or opening through which the ears of corn successively travel.

Figure 7:
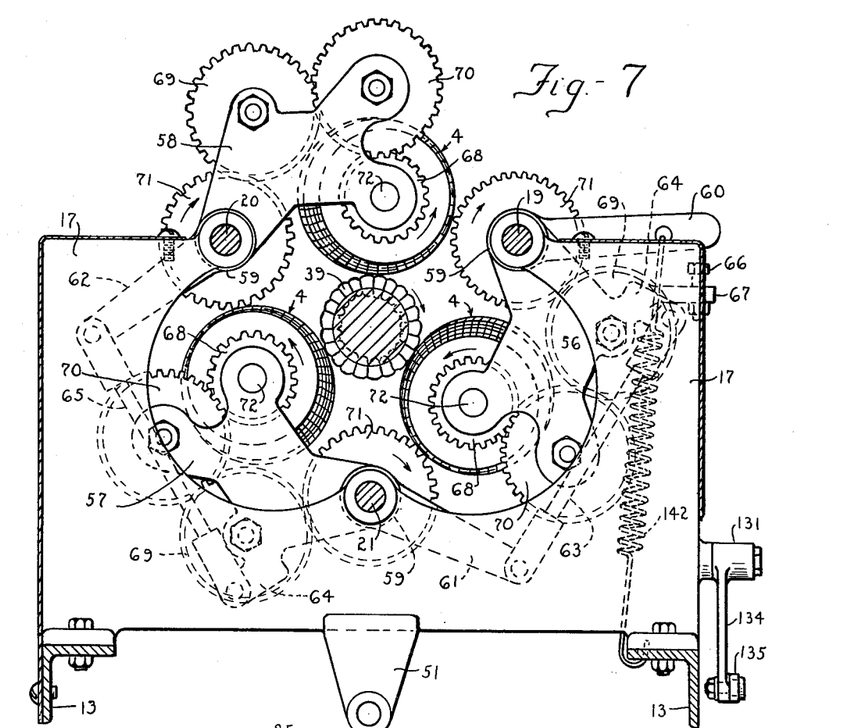
FIGURE 7 is an enlarged transverse elevational view taken substantially on line 7—7 of FIGURE 1, depicting the operative relationship of a second set of rollers.

It will be noted by referring to FIGURE 7 that the support 56 is mounted on the shaft 19 to more or less dispose the right or lower roller in a depending or hanging position relative to this shaft; that the support 57 is mounted on the shaft 21 to dispose the left roller in an elevated position relative to this shaft; and that the upper support 58 is mounted on the upper shaft 20 to locate the upper roller in an overhanging position. It will further be noted that the supports 56, 57 and 58 are respectively provided with arms 60, 61 and 62 extending from the hubs 59; that a connecting rod 63 has one end pivotally connected to the arm 61 of support 57 and its other end to an offset 64 on support 56 for connecting these supports together; that a connecting rod 65 has one end pivotally connected to an offset 64 on the support 57 and its other end to the arm 62 on the support 58 for connecting the supports 57 and 58 together; and that the arm 60 on the hub 59 of support 56 is normally engaged with an adjustable stop 66 carried by an extension 67 on the standard 17. With this unique organization, the supports may be simultaneously rocked or rotated on the drive shafts to simultaneously move the rollers toward or away from a common center line between the shafts 19, 20 and 21. The stop 66 may be adjusted to vary the spacing between the rollers 4 so the latter will accommodate ears of minimum cross-sectional dimensions. The arrangement is such that the rollers will be simultaneously rotated by the shafts 19, 20 and 21 through the agency of gears as will now be explained.

Each of the rollers 4 is provided with a gear 68, each of the supports 56, 57 and 58 with a pair of gears 69 and 70 and each of the longitudinal drive shafts 19, 20 and 21 with a gear 71. Each of the gears 69 meshes with the gears 70 and the gears 71 and the gear 68 meshes with the gear 70 in such a manner that when the drive shafts are rotated the rollers will rotate in the directions indicated by the arrows in FIGURE 7 through the agency of this gearing irrespective of the rotative positions of the supports on the shafts. The gears 69 and 70 are detachably mounted on suitable stub shafts or pivots extending forwardly from the supports.

Figure 8:
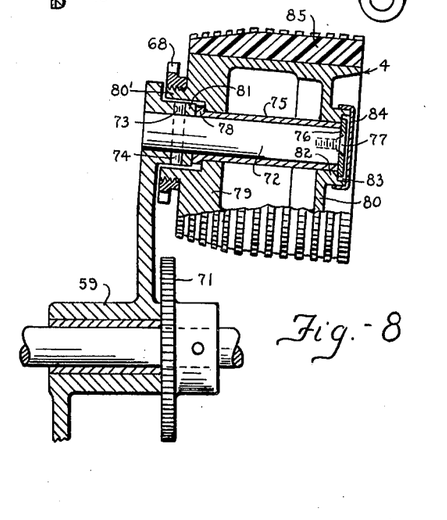
FIGURE 8 is a sectional view taken through one of the roller subassemblies of the second set.
Figure 9:
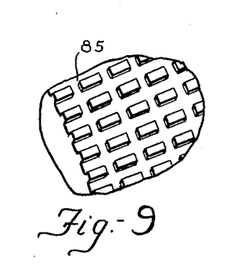
FIGURE 9 is a partial perspective view showing the character of the exterior traction surfaces on the second set of rollers.

Each of the rollers 4 is mounted on a shaft or axle 72 as illustrated in FIGURES 7 and 8. More specifically in this regard, one end of each of the shafts is detachably secured against rotation in a tubular formation 73 of a support by a key 74. A bearing sleeve 75 is mounted on each shaft and detachably held in place by a washer 76 and a screw 77, the latter of which extends through the washer and into the shaft to place a flanged end 78 of the sleeve against the formation 73. The roller includes a cylindrical body having a pair of axially spaced end walls 79 and 80 having openings therein through which the shaft 72 and bearing sleeve 75 extend. The bearing sleeve is preferably firmly secured in the body. The end wall 79 is provided with a threaded extension 80' having a gear 68 threadedly attached thereto and a recess 81 within which the tubular extension 73 of the support and the flange 78 of the bearing is located. The wall 80 is provided with an extension 82 having an axial recess 83 within which the washer 76 and screw 77 are disposed. A cap 84 is preferably press-fitted over the extension in spaced relation to the washer and screw. The exterior cylindrical surface of each roller is preferably provided with a tubular sleeve 85 of rubber or equivalent resilient material having teeth, corrugations or suitable friction or traction producing structure thereon. The rear extremity of each sleeve is preferably tapered or made frusto-conical to assist in piloting and receiving the fore end of each ear of corn while its rear end is being carried by the first set of rollers 3. The fore extremity of the sleeve is substantially cylindrical. The shafts 72 supporting the rollers are angularly or substantially spirally disposed so that the rollers will grip and convey the ears of corn therebetween to the third set of rollers 5, which will now be described.

Figures 10, 11, 12:
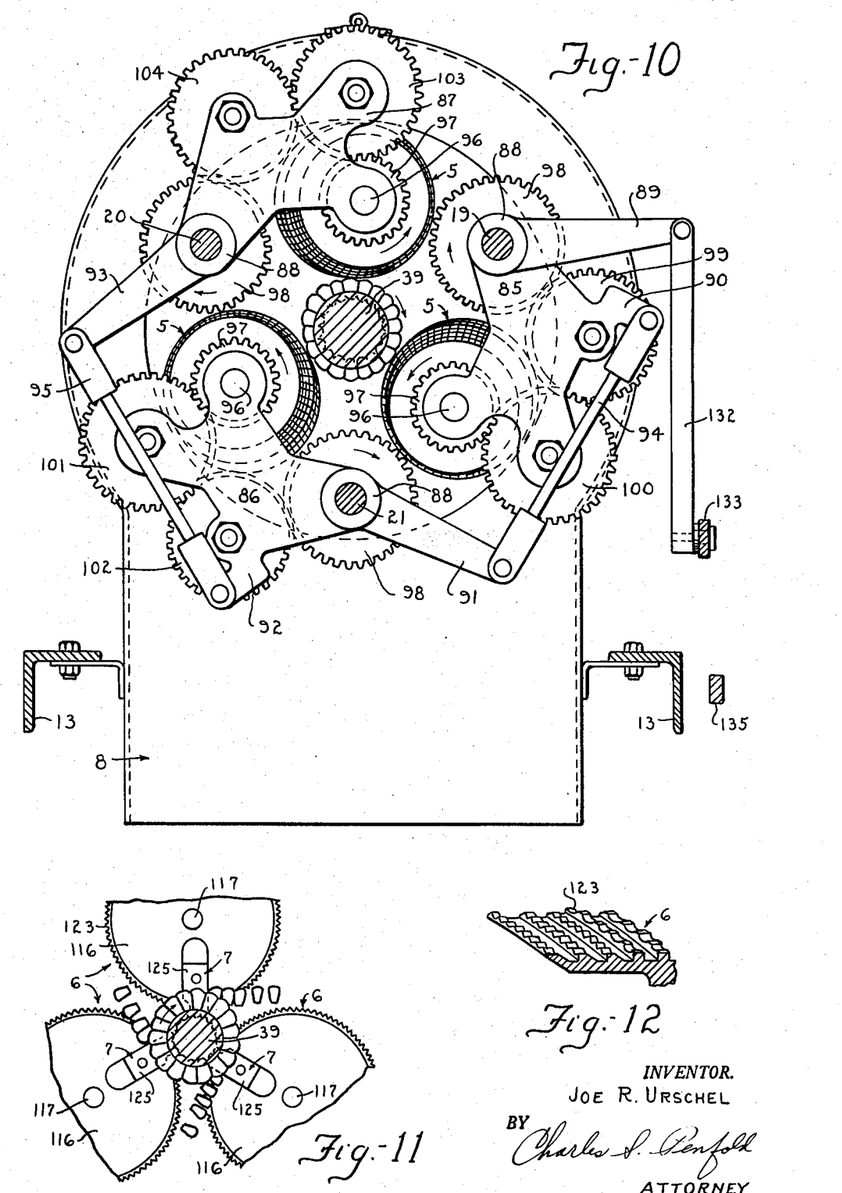
FIGURE 10 is an enlarged transverse elevational view taken substantially on line 10—10 of FIGURE 1, illustrating the structural relationship of a third set of rollers.
FIGURE 11 is an enlarged elevational end view of a fourth set of rollers and cutters which are associated therewith for severing the corn as exemplified.
FIGURE 12 is a partial perspective view showing the character of the traction surfaces on the fourth set of rollers.

The third set of three rollers 5, clearly depicted in FIGURES 4 and 10, are respectively carried by a plurality of supports 85, 86 and 87 which substantially correspond to the supports 56, 57 and 58 and are respectively rockably mounted on the longitudinal shafts 19, 21 and 20 by cylindrical hubs 88 through which the shafts extend. The support 85 is provided with an arm 89 extending radially from its hub 88 and also with an offset 90; the support 86 with an arm 91 extending from its hub and an offset 92; and the support 87 with an arm 93 extending from its hub. An adjustable connecting rod 94 has its ends respectively pivotally connected to the offset 90 on the support 85 and the end of arm 91 of support 86 for connecting these supports for rocking movement on the shafts 19 and 21. Another connecting rod 95 has its ends pivotally connected to the offset 92 on the support 86 and to the arm 93 of the support 87 for connecting these two supports together. All of the connections between the supports are such that the supports can be simultaneously rocked on the drive shafts to simultaneously move the rollers toward or away from a common center line between the drive shafts in a manner substantially corresponding to that of the rollers 4 and supports therefor.

Each of the rollers 5 is designed and constructed and mounted in substantially the same manner as the rollers 4 in FIGURE 8. More particularly in this regard, each of the rollers 5 is mounted on an angular shaft 96 on each support and provided with a gear 97 and each of the longitudinal drive shafts 19, 20 and 21 is provided with a gear 98 keyed thereto. The support 85 is further provided with a pair of gears 99 and 100 which mesh with one another and respectively mesh with the gears 98 and 97 on the drive shaft 19 and a roller; the support 86 with meshing gears 101 and 102 which respectively mesh with gears 97 and 98; and support 87 with meshing gears 103 and 104 which respectively mesh with gears 97 and 98 so that when the shafts 19, 20 and 21 are rotated by the power unit 12 the rollers 5 will rotate in the same direction as the rollers 4 as indicated by the arrows in FIGURES 7 and 10. The rollers 5 rotate at the same speed as rollers 4 and serve to embrace, rotate and carry each ear of corn forwardly to the three rollers 6, where the kernels are removed and any milk or juice remaining on the cob is squeezed therefrom. It will be noted that the shafts 96 carrying the rollers 5 are angularly or spirally arranged in substantially the same manner as the shafts for the rollers 4 and that the rollers 5 are similarly provided with traction sleeves.

The fourth set or group of three rollers 6 is clearly illustrated in FIGURES 4, 11, 13 and 14. The rollers are identical and each is preferably mounted for rotation about a rearwardly extending tubular shaft 105 as distinguished from forwardly extending shafts which support the rollers 3, 4 and 5. One extremity of each of these shafts is preferably detachably secured in a clamp 106 carried by an offset or arm 107 extending from a hub 108 rockably or rotatably mounted on each of the longitudinal shafts 19, 20 and 21. As viewed particularly in FIGURE 13, the hub 108 on the drive shaft 20 is provided with an additional radial arm 150, the hub on the drive shaft 21 with a pair of additional radial arms 151 and 152 and the hub on the drive shaft 19 with an additional pair of radial arms 153 and 154. The arms 150 and 151 are connected together by a connecting rod 155 and the arms 152 and 154 by a connecting rod 156 so that all of the hubs 108 and rollers carried by the arms 107 thereon can be simultaneously rocked or rotated about the axes of the drive shafts. Each of the rollers is preferably in the form of a cast or one-piece body having axially spaced portions 109 and 110 provided with openings through which a bearing sleeve 111 mounted on the shaft 105 extends. A washer 112 is mounted on each of the shafts 105 between the clamp 106 and the inner end of the bearing sleeve and an exteriorly threaded extension 113 formed on each body. A gear 114 is threadedly attached to each extension 113 for engaging a gear 115 carried by and keyed to each of the drive shafts 19, 20 and 21, so that rotation of these shafts will simultaneously rotate the rollers.

Figure 14:
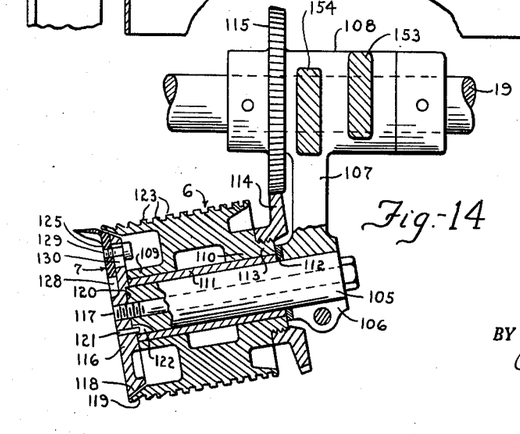
FIGURE 14 is a sectional view taken through one of the fourth set of rollers depicting its construction and mode of mounting.

A head plate or disc 116 for supporting each of the cutters 7, above referred to, is detachably secured to each of the shafts 105 by a bolt 117 extending through the shafts. The periphery of each plate is bevelled as indicated at 118 for close disposition in a tapered recess 119 formed in the rear end of each roller body and the center portion of each plate is preferably recessed at 120 for receiving the rear end of a tubular shaft 105. Each plate is also provided with a threaded aperture which receives the threaded end of a bolt 117 for detachably holding the roller and plate relative to the shaft and with an abutment preferably in the form of a pin 121 which engages an abutment preferably in the form of a pocket or notch 122 provided in each tubular shaft as depicted in FIGURE 14 in order to fix or key each plate to a shaft for non-rotation.

The foregoing organization of components has proven satisfactory in actual use but it is to be understood that the rollers 6 may be rotatably mounted in other ways and that the plates can be otherwise fixed against rotation. The cylindrical exterior portions of the rollers 6 are preferably provided with corrugations, interruptions, teeth, grooves, combinations of these, or other suitable traction or pressure distributing structure 123 for efficiently extracting or removing any milk or juice or fragmentary portions of the kernels from the cob while the latter is being squeezed or compressed during its rotation and conveyance by the rollers to the chute 11 for discharge from the machine into a suitable container not shown. Another purpose of the interruptions on the exterior portions of the rollers 6 is to provide positive traction on the cob as the kernels are cut from the cob. It will be noted that the shafts for supporting the rollers 6 are angularly or spirally disposed in a manner substantially corresponding to the shafts which support the rollers 4 and 5 so that the rollers 6 will grip and convey each cob or core of a product to the chute, which chute receives the fore end of the cob before the cob leaves the rollers 6.

The chute 11 is preferably of channel shape and extends through an opening 124 in the standard 18 with its inner extremity disposed in a relative close axial relationship with the passage defined by the rollers 6 as depicted in FIGURES 2 and 4. The chute may be detachably secured in a firm position in any manner desired.

Figure 15:
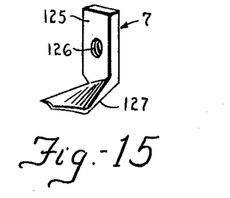
FIGURE 15 is a perspective view of one of the three cutters.
Figure 16:
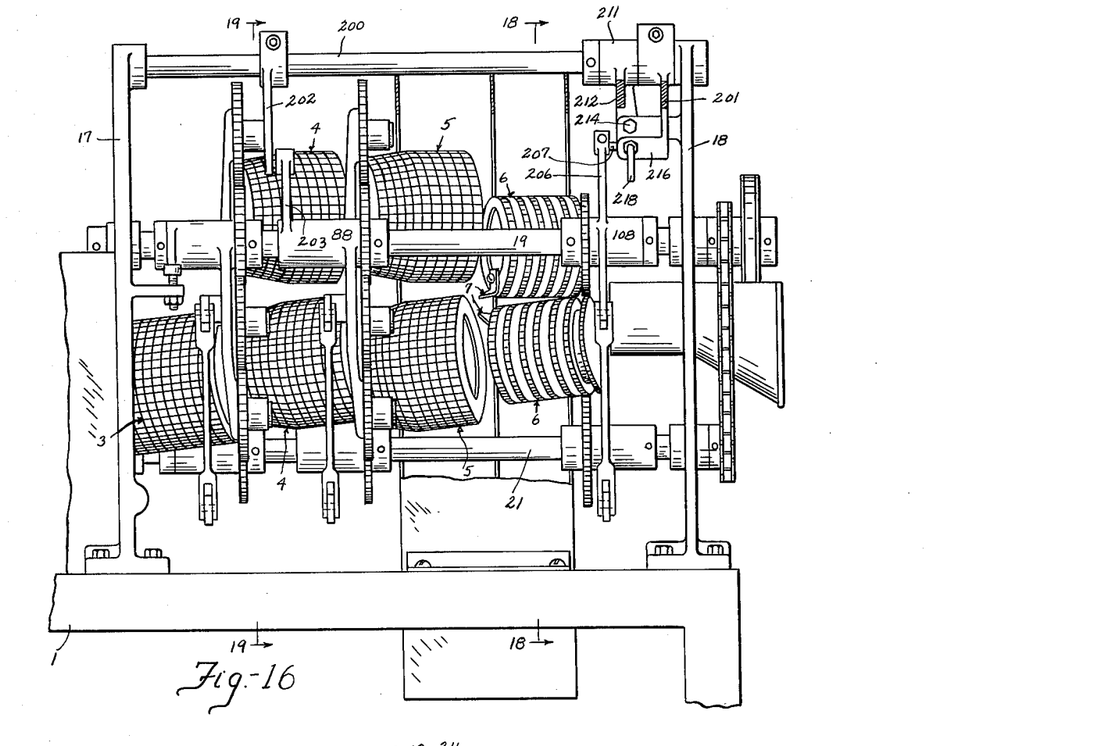
FIGURE 16 is a partial side elevational view similar to FIGURE 4, exemplifying a modified structure.
Figure 17:
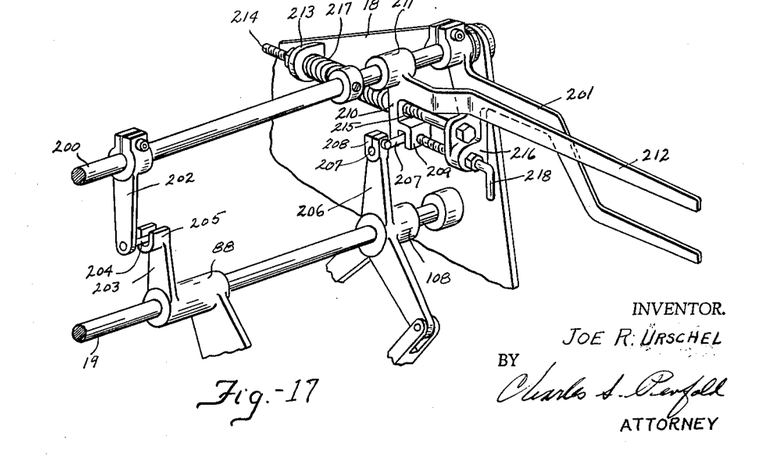
FIGURE 17 is a partial perspective view illustrating certain adjustments and manual controls forming a part of the modified structure shown in FIGURE 16.
Figure 18:
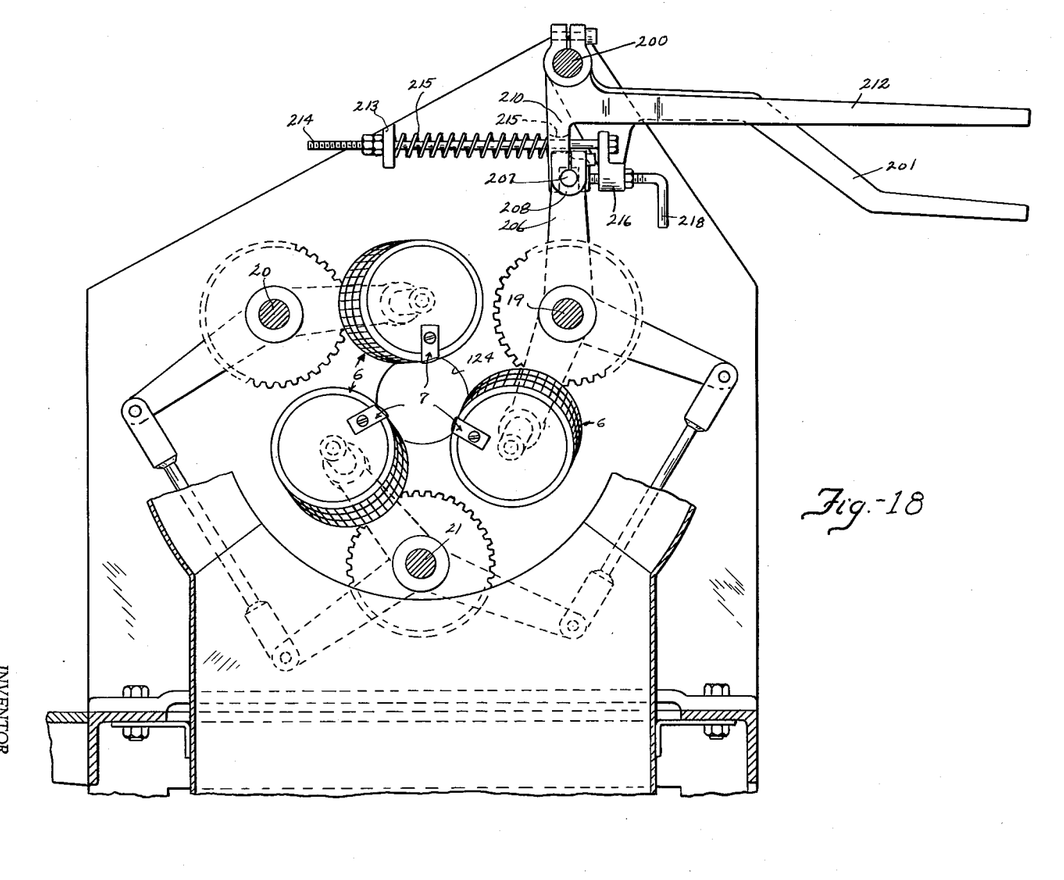
FIGURE 18 is a vertical section taken substantially on line 18—18 of FIGURE 16.
Figure 19:
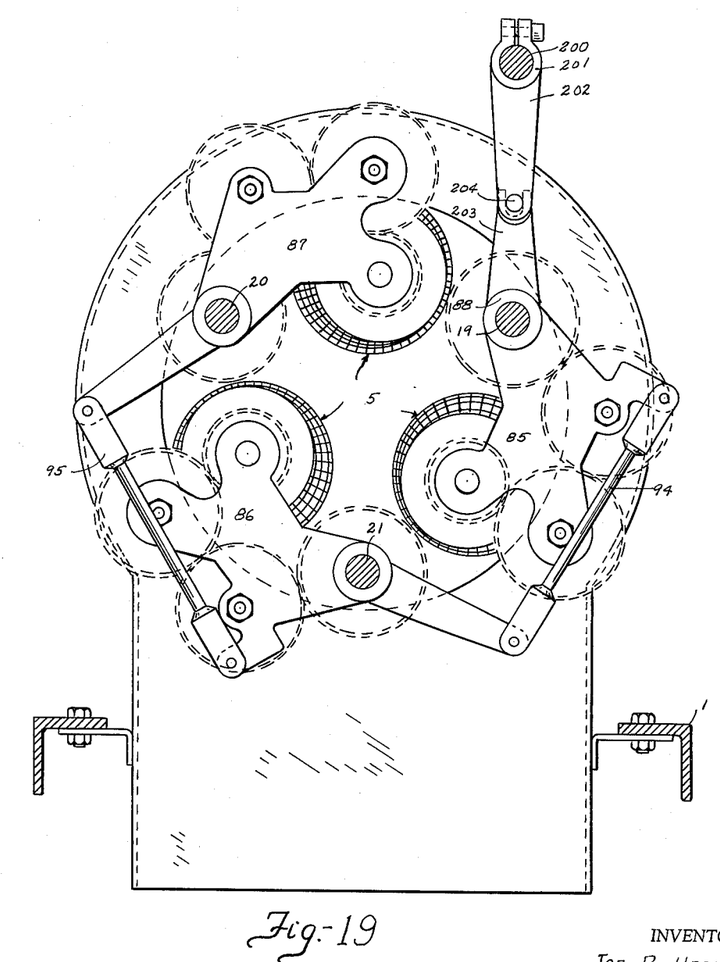
FIGURE 19 is a vertical section taken substantially on line 19—19 of FIGURE 16.

The three cutters 7 may be designed and constructed and mounted in various ways but as depicted in FIGURES 11 and 15, and stated above, they are preferably respectively carried by the plates 116. The cutters are identical and unique in design and construction and each includes a rectangular base 125 having a threaded aperture 126 therein and an angularly disposed offset blade 127. The base of each cutter is slidably mounted for chordal movement in a longitudinal recess 128 provided in the front side of each plate 116 and intersecting its periphery.

A screw 129 extends through a chordal slot 130 intersecting each of the recesses 128 for infinitely adjustably securing each cutter in any position desired. In other words, the cutters can be adjusted generally on the rollers toward or away from a common center line between the rollers. By arranging the cutters as described, the blades thereof are properly positioned to efficiently cut or sever the kernels from each ear while it is jointly and firmly held, rotated and conducted toward the chute 11 by the rollers 5 and 6. The corn is cut spirally at three different but equally spaced circumferential locations at a predetermined rate of speed and in such a manner that the cutters will each sever approximately one-third of the layer of corn from the cob.

Figure 13:
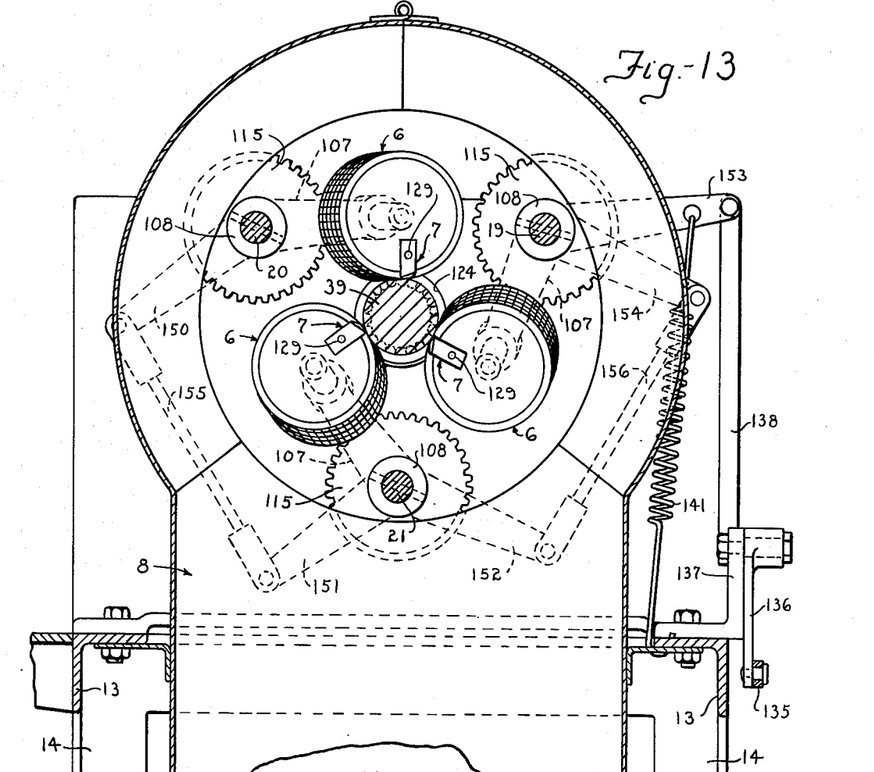
FIGURE 13 is an enlarged transverse elevational view taken substantially on line 13—13 of FIGURE 1, showing the operative relationship of the fourth set of rollers which are utilized to squeeze the cob as the corn is removed from its cob.

As the corn is severed or removed from the cob it falls into the chamber 9 of the chute 8 and any juice or fragments of corn removed from the cob by the rollers 6 will fall into the chamber 10 of the chute. One or two containers, not shown, may be placed below the chute for collecting the corn and juice as desired. It will be noted that axially spaced vertical walls of the chute are provided with suitable clearance openings for the rollers 5 and 6 as shown in FIGURES 4, 10 and 13, and that the support 17 is provided with suitable clearance openings for the pair of rollers 3 as shown in FIGURES 5, 6 and 7. The chute is also designed and constructed to confine the splashing of any juice. It is to be understood that a suitable cover or covers may be utilized to protect other components of the machine to promote safety.

As alluded to above, one of the objects of the invention, is to provide unique means for gauging or automatically controlling the depth that the cutters sever the kernels of corn from the cob. This is preferably accomplished by operatively connecting and urging the supports for the rollers 5 and 6 toward the common center line between the drive shafts 19, 20 and 21. More specifically in this respect and as exemplified in FIGURES 4, 7, 10 and 13, a lever 131 is pivotally connected to the standard 17 and to a vertical link 132. The upper end of this link is pivotally connected to the free end of the arm 89 extending from the hub 88 on the support 85 and the lower end of the link is pivotally connected to the free end of an elongated horizontal leg 133 of the lever. The lever has a depending leg 134 having a free end which is pivotally connected to one end of a relatively long horizontal link 135. A lever 136, similar to the lever 131, is pivotally connected to an upright 137 carried by the frame and has a depending leg pivotally connected to the opposite end of the elongated link 135 and a horizontal leg pivotally connected to the lower end of a vertical link 138. The upper end of the vertical link 138 is pivotally connected to the arm 153 extending from a hub 108 on the shaft 19.

An adjustable stop 140 is preferably carried by the frame for engaging the horizontal leg 133 of the lever 131 for limiting and determining the extent that the rollers 5 and 6 and supporting arms therefor can swing inwardly or transversely toward the common center line between the drive shafts or longitudinal passage generally defined by the sets of rollers 3 through 6. A helical spring 141 has its upper end connected to the arm 153 and its lower end to one of the rails 13 of the frame for normally simultaneously urging the rollers 5 and 6 and cutters 7 inwardly to the positions limited or predetermined by the stop 140, which stop can be readily adjusted to space the rollers 5 and 6 apart to respectively properly accommodate the ears and the cobs, the cross-sectional dimensions of which have been previously determined so that the stop can be adjusted thereto. (In other words, after the stop is once set for an average size ear, it need not be changed unless there is an unusual variation in the size of the ears.) Obviously, any other stop means may be employed to predetermine the limits of the inward swing of the rollers 5 and 6 and cutters 7. For example, a stop could be provided under the horizontal leg of the lever 136 or for engagement by either of the other legs of the levers or any one of the links 132, 135 and 138. Also, if desired, the spring 141 could be relocated so that it is directly connected to either of the vertical links 132 and 138 and to the frame or directly to either of the levers 131 and 136 and to the frame structure to simultaneously urge the rollers 5 and 6 and cutters 7 inwardly.

Attention is directed to the fact that the length of the horizontal leg 133 of the lever 131 is somewhat longer than the length of the horizontal leg of the lever 136 so that when the supports for the sets of rollers 5 and 6 are simultaneously rocked about the axes of the drive shafts the rollers 5 and supports therefor will rock or swing a greater distance than the rock or swing of the rollers 6 and their supports. This difference in the lengths of the horizontal legs of the levers serves to cause the rollers 6 and cutters to swing toward and away from the common center line in proportional response to the operation of the rollers 5 and vice-versa. The longitudinal passages defined by the rollers 4 and 5 substantially correspond and are somewhat greater in cross-dimension than the passages defined by the rollers 6 as the former receive the ear of corn which is of a greater cross-sectional dimension than the cross-sectional dimension or size of the cob, the latter of which is embraced only by the rollers 6.

Attention is also directed to the fact that a helical spring 142 has its ends respectively connected to the lever 60 on the support 56 and the frame, as viewed in FIGURES 4 and 7, for simultaneously urging the supports 56, 57 and 58 and rollers 4 carried thereby toward the common center between the drive shafts. This urging means operates independently of the urging means 141 for the supports carrying the rollers 5 and 6.

With the foregoing in mind, when the machine is operating and ears of corn are placed in the trough, they will level out and be carried longitudinally to the pair of rollers 3 which will rotate and convey each ear to the rollers 4 which are spread apart by each ear as it is received therebetween. As pointed out above, the rollers 4 are normally held in a predetermined spaced relationship by the arm 60 engaging the stop 66 and the rollers 5 and 6 are similarly held in a predetermined spaced relationship by the lever 131 which engages the stop 140. The rollers 4 are tapered at their rear ends and assist in piloting each ear between these rollers which forcibly engage or clamp each ear and cause it to rotate and travel to the set of the rollers 5 which are also preferably tapered to receive and pilot the ear therebetween. When the ear is received by the rollers 5 the rollers will spread apart like the rollers 4 and clamp the ear and rotate and convey it forwardly toward the rollers 6. When the rollers 5 are spread apart by the ear, the supports carrying these rollers will swing or rock outwardly on the drive shafts and due to the levers and links connecting the supports for the rollers 5 and 6, the supports for the rollers 6 will also rock outwardly proportionally to the rocking of the supports for the rollers 5 to automatically simultaneously spread the rollers 6 and cutters 7 apart so that the corn will be severed from the cob while the latter is being squeezed, rotated and conveyed by the rollers 6 onto the chute for discharge therefrom. As alluded to above, the corn which is severed from the ear falls into the chamber 9 and any juice and/or fragments extracted from the cob following the cutting operation fall into a chamber 10 of the chute 8.

It is thus apparent that the rollers 6 and cutters 7 carried by the supports therefor are simultaneously moved about the axes of the drive shafts 19, 20 and 21 whenever the rollers 5 and supports therefor are rocked about the axes of the drive shafts. There is a definite relationship between the outside diameter of an ear of corn and the diameter of the cob. As the outside diameter of the ear increases the diameter of the cob increases, but by a proportionally smaller rate. Thus, as an ear of corn is engaged by the rollers 5, the rollers 6 and cutters 7 are automatically adjusted to the proper positions to receive the cob and to start the cutting at the depth desired. This is accomplished by the levers and links connecting the supports for the rollers 5 and 6. This construction has several advantages. It prevents the cutters or knives from digging into the end of the cob and allows the cob to enter easily between the rollers 6. In an average ear, the exterior surface of the ear is contacted by the rollers 5 and the interior surface of the cob is contacted by the discharge rollers 6 so that these surfaces jointly act as gauging means to control the depth of cut of the knives and to feed the ear positively through the rollers 5 and 6 as the kernels are being removed. Also, if the diameter of the cob is larger than average, the rollers 6 act as gauging means and prevents the knives from cutting too deeply into the cob. Otherwise expressed, the linkage assembly, among other things, affords a setup whereby the swinging motion of the rollers 5 is greater than that of the rollers 6 and knives carried thereby. This feature is important because when an ear of corn enters between the rollers 5, the knives will be set or automatically adjusted to cut the kernels at the proper depth, depending upon the diameter of the ear of corn being cut. The larger the diameter of the ear, the greater the depth of kernels and the organization automatically presets the knives to obtain the most desirable depth of cut. The arrangement of linkages also serves to cause the discharge rollers 6 to maintain the proper depth of cut on the rear extremity of the ear after the rollers 5 are no longer in engagement with the kernels and further causes both sets of rollers 5 and 6 to engage and turn the ear while it is being cut.

It is to be understood that although the sets or groups of rollers 3 through 6 have been described in the particular order of their use, they may be otherwise referred to in the claims.

Referring now to the structure exemplified in FIGURES 16, 17, 18 and 19 there is disclosed means whereby certain groups of the rollers may be respectively moved toward and away from the longitudinal axis or path that the product travels.

As illustrated therein, the machine is provided with an overhead horizontal rotatable shaft 200 journalled on the supports 17 and 18 above the shaft 19. A manually operable master lever 201 is fixed to the shaft for rotating the same, including the shaft 19 as well as the shafts 20 and 21 operatively connected thereto, as above described. The overhead shaft 200 is provided with an arm or lever 202 which is operatively connected to an arm or lever 203 on the hub 88 mounted on the shaft 19. The lever 202 is preferably provided with a pin 204 which is journalled in a stirrup 205 on an arm or lever 203. The shaft 19 is provided with an arm or lever 206 extending from the hub 108. A pin 207 is secured in a clamp 208 on the arm 206 for disposition in a formation 209 on an arm 210 extending from a hub 211 journalled on the shaft 200. A manually operable lever 212 is carried by the hub 211.

Attention is directed to the fact that the distance between axis of the shaft 200 and the axis of the pivotal connection between the arms 202 and 203 is substantially equal to the distance between the axis of the shaft 19 and the axis between the pivotal connection between the arms 206 and 210. Of further significance is the fact that the distance between the shaft 19 and the pivotal connection between the arms 202 and 203 is substantially equal to the distance between shaft 200 and the pivotal connection between the arms 206 and 210. Otherwise expressed, the arms 202 and 203 are of unequal lengths. The arm 202 is 3 inches in length and the arm 203 2 inches in length, which is a ratio of 2½:3, with the result that the shaft 200 is rotated ⅔ of any amount which the arm 203 may move about the axis of the shaft 19. The same is substantially true with respect to arms 210 and 206 which are in the same ratio as arms 202 and 203, with the result that the arm 206 rotates about the axis of the shaft 19 an amount equal to ⅚ of any rotation imparted to the shaft 200. Thus, rotation induced in arm 203 by the entry of a product, such as an ear of corn, into the feed rollers 5 from the rollers 4, is transmitted to the arm 206 to a degree according to the ratio between the arms 203 and 202 and arms 210 and 206 acting in combination with one another. More specifically, rotation of the arms 206 is ⅚×⅚ or .694:1.0 or slightly more than two-thirds of the rotation of arm 203. With this unique organization, the discharge rollers 6 are controlled and gauged by the product or corn entering the feed rollers 5 with the same effect as the linkage structure described above.

The manually operable lever 212 functions independently of the master lever 201 and may be forced downwardly to cause the discharge rollers 6 and knives 7 to be simultaneously moved outward from the longitudinal axis of the machine or path which is travelled by the product. This factor is important as it serves to free any obstruction for removal, such as an ear of corn lodged crosswise in the path of travel.

The master lever 201 functions in cooperation with the lever 212, but cannot function independently thereof. In the event of an obstruction, as indicated above, a downward force on the lever 201 will cause the feed rollers 5 and the discharge rollers 6 to be simultaneously moved outward from the longitudinal path, thus freeing the obstruction for removal.

Provision is made for adjusting the manual levers 201 and 212 with respect to one another. More specifically, an apertured lug 213 is carried by the standard 18 and a bolt 214 extends through this lug, an aperture 215 provided in the lever 210 and through an aperture provided in an offset 216 carried by the master lever 201. A helical spring 217 is carried by the bolt and interposed between the lug 213 and the arm 210 for urging the lever 212 in a direction to cause the formation 209 thereon to engage a screw 218 carried by the offset 216. The manual lever 212 is restrained in an adjusted location by the action of the spring 217 and the master lever 201 is restricted in outward movement by the bolt 214 which freely extends through the aperture 215. Movement of the feed rollers 5 toward the axis of the longitudinal path of the product is limited by the length of the bolt 214. The adjustments are made in accord with the size of the product to be received. Movement of the discharge rollers 6 toward the axis of the longitudinal path in turn is determined by the adjustment of the screw 218. More specifically, by shortening the effective length of the bolt the feed rollers 5 and the discharge rollers 6, including the knives 7, may be located further distances from the longitudinal axis of the machine or closer to said axis by adjusting the bolt to increase its effective length. By adjusting the screw and not the bolt, the distance between the feed rollers and the longitudinal axis or path may be varied.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described.

I claim:

1. A machine for cutting corn from its cob comprising: a frame, a plurality of supports rockably mounted on the frame for movement about axes disposed in parallel relation, shafts respectively fixed on said supports and arranged in a substantially spiral relationship, rollers respectively mounted for rotation about the longitudinal axes of said shafts, a plurality of cutters, individual supports for mounting each of the cutters for independent swinging movement adjacent to the rollers, means operatively connecting said roller supports and said cutter supports for effecting simultaneous movement between said supports whereby the roller supports move proportionally to and through greater ranges than said cutter supports, and means for normally urging the supports so that the rollers will clamp an ear of corn when placed therebetween.

2. The structure defined in claim 1, including means connecting said roller supports and said cutter supports for effecting their simultaneous movement and so that said cutter supports move proportionally to and lesser amounts than said roller supports.

3. A machine of the character described comprising: a frame, three long longitudinally extending parallel shafts rotatably mounted on the frame, a first set of three supports respectively mounted on the shafts in planes substantially transverse to the axes of the shaft, short shafts respectively carried by the supports, rollers mounted for rotation about the axes of the short shafts for rotating and conveying a product such as an ear of corn, a second set of three supports mounted on the long shafts and provided with short shafts with rollers mounted for rotation about the axes of these short shafts for rotating and conveying the product, a third set of three supports rockably mounted on the long shafts and provided with fixed shafts with rollers mounted for rotation about their axes, cutters respectively carried by the fixed shafts, means operatively connecting all of the rollers with the long shafts for rotating the rollers so that the product will be rotated and conveyed by the first and second sets of rollers to the cutters for removing the kernels from the ear, means for rockably urging the third set of supports toward a common center so that the rollers thereon will squeeze the cob as the kernels are removed in order to release any juice and/or portions of kernels which have not been previously removed from the cob by the cutters.

4. A machine of the character described comprising: a frame, three longitudinally extending parallel drive shafts rotatably mounted on the frame, a first set of three supports respectively mounted on the shafts in planes substantially transverse to the axes of the shafts, short shafts respectively carried by the supports, rollers mounted for rotation about the axes of the short shafts for rotating and conveying a product such as an ear of corn, a second set of three supports rockably mounted on the drive shafts and provided with fixed shafts with rollers mounted for rotation about their axes, cutters respectively carried by the fixed shafts, means operatively connecting all of the rollers with the drive shafts for rotating the rollers so that the product will be rotated and conveyed by the first set of rollers to the cutters for removing the kernels from the ear, means for rockably urging the second set of supports toward a common center so that the rollers thereon will squeeze the cob and release any juice and/or portions of kernels which have not been previously removed from the cob by the cutters, operating means for directly rotating one of the drive shafts, and means operatively connecting the other drive shafts to said one shaft so that all of the drive shafts will be simultaneously rotated when said operating means is operated.

5. A machine of the kind described comprising: a frame, three longitudinally extending drive shafts journalled on the frame and provided with gears, a first set of three connected supports respectively rockably mounted on said shafts, three rollers respectively rotatably mounted on the supports, a second set of three connected supports respectively rockably mounted on said shafts in axially spaced relationship to said first set of supports, three rollers respectively rotatably mounted on the second set of supports, a gear carried by each of the rollers, a plurality of gears carried by each of said supports operatively connecting the gears on the rollers with the gears on the shafts for rotating the rollers when the shafts are rotated, cutter means interposed between the sets of rollers for removing the edible part of a food product carried by a core when such product is rotated and conveyed by the first set of rollers, and means for simultaneously rockably urging the sets of rollers so the first set will grip the product before its edible part is removed and the second set will squeeze the core to remove any juice therefrom while the product is being rotated and conveyed by the rollers.

6. The machine defined in claim 5, including a mounting carried by the frame, a pair of shafts extending from the mounting, a pair of rollers respectively journalled on these shafts, and means operatively connecting this pair of rollers with one of the drive shafts for effecting their rotation to direct the product to the first set of rollers.

7. The machine defined in claim 5, including a gear box mounted on the frame, a pair of shafts and a third shaft extending from the box, a pair of rollers journalled on the pair of shafts, means operatively connecting this pair of rollers with one of the drive shafts for effecting their rotation to direct the product to the first set of rollers, a belt conveyor mounted on the frame, and means operatively connecting the third shaft with said drive shaft and said conveyor for operating the latter to direct the product to said pair of rollers.

8. The structure defined in claim 5, including a chamber for receiving the severed edible part, and a chamber for receiving any juice extracted from the core by the second set of rollers.

9. The machine defined in claim 5, including means interposed between the sets of rollers whereby rockable movement of the first set of rollers in gripping the product is transmitted to the second set of rollers to preset the second set of rollers and cutters for removing the edible part of the product.

10. The machine defined in claim 5, including means interposed between the sets of rollers whereby rockable movement of the first set of rollers in gripping the product is transmitted to the cutters for removing the edible part of the product.

11. A machine of the kind described comprising three longitudinally extending shafts arranged in parallel relation and about a common longitudinal axis, a plurality of supports mounted on said shafts for movement about their respective axes, rollers, means respectively supporting said rollers in a spiral relationship on said supports, cutters carried by supports, and means connecting said supports for effecting simultaneous movement thereof when a product is engaged by said rollers for movement along said longitudinal axis.

12. A machine of the kind described comprising a frame, longitudinally extending parallel shafts mounted on said frame, a first set of supports carried by said shafts for movement about their axes, rollers respectively carried by said supports for rotation about axes disposed in a spiral relationship, means for rotating the rollers for engaging and conveying an ear of corn therebetween, a second set of supports carried by shafts for movement about their axes, cutters respectively carried by said second set of supports, a pair of levers pivotally mounted with respect to said frame, a link pivotally connected to said levers, a pair of links respectively connecting said levers to one of said roller supports and one of said cutter supports for causing the latter to move proportionally to and lesser amounts than the roller supports, and means for urging the rollers and cutters toward a common axis, the arrangement being such that when an ear is introduced between the rollers, the latter are spread apart to locate the cutters for cutting the kernels from the cob.

13. A machine of the kind described comprising three longitudinally extending shafts arranged in parallel relation and about a common longitudinal axis, a plurality of supports mounted on said shafts for pivotal movement about their respective axes, rollers, means respectively supporting said rollers in a spiral relationship on certain of said supports, cutters carried by certain of said supports, means connecting said roller supports for effecting simultaneous movement thereof when a product is engaged by said rollers for movement along said longitudinal axis, means connecting said cutter supports for simultaneous movement, a fourth longitudinally extending shaft disposed in parallel relationship to said three shafts, a fitting carried by said fourth shaft operatively connected to at least one of said roller supports, a lever carried by said fourth shaft operatively connected to at least one of said roller supports whereby all of said roller supports may be manually pivoted toward or away from said longitudinal axis, and means carried by said fourth shaft operatively connected to at least one of said cutter supports whereby all of said cutter supports may be manually pivoted toward or away from said longitudinal axis.

References Cited by the Examiner

UNITED STATES PATENTS

| | | | |
|---|---|---|---|
| 695,806 | 3/02 | Wode et al. | 130—9.2 |
| 722,874 | 3/03 | McIntyre | 130—9.1 |
| 1,282,789 | 10/18 | Fenn | 130—9.4 |
| 1,282,791 | 10/18 | Fenn | 130—9.2 |
| 1,301,200 | 4/19 | Waern | 144—208.6 |
| 1,747,471 | 2/30 | Eckardt et al. | 198—204 |
| 2,156,020 | 4/39 | Lathrop | 198—204 |
| 2,214,285 | 9/40 | Schmidt | 130—9.1 |
| 2,610,635 | 9/52 | Morral | 130—9 |
| 2,642,068 | 6/53 | Urschel | 130—9 |
| 2,713,881 | 7/55 | Shideler | 146—221 |
| 2,766,794 | 10/56 | Odale | 146—227 |
| 2,771,922 | 11/56 | Gyllenberg | 144—208.6 |
| 2,857,945 | 10/58 | Brundell et al. | 144—208.5 |

ABRAHAM G. STONE, *Primary Examiner.*

J. SPENCER OVERHOLSER, ANTONIO F. GUIDA, T. GRAHAM CRAVER, *Examiners.*